United States Patent
Conneely et al.

(10) Patent No.: US 9,762,810 B2
(45) Date of Patent: Sep. 12, 2017

(54) METHOD FOR ACTIVATING AND DEACTIVATING AN IMAGE CORRECTION FUNCTION, CAMERA SYSTEM AND MOTOR VEHICLE

(71) Applicant: Connaught Electronics Ltd., Tuam, County Galway (IE)

(72) Inventors: Peadar Conneely, Roscam (IE); Patrick Eoghan Denny, Roscam (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 265 days.

(21) Appl. No.: 14/449,187

(22) Filed: Aug. 1, 2014

(65) Prior Publication Data
US 2015/0035985 A1    Feb. 5, 2015

(30) Foreign Application Priority Data
Aug. 1, 2013  (DE) .................. 10 2013 012 810

(51) Int. Cl.
| | | |
|---|---|---|
| *H04N 5/243* | (2006.01) | |
| *B60R 1/00* | (2006.01) | |
| *H04N 9/73* | (2006.01) | |
| *H04N 5/357* | (2011.01) | |
| *H04N 5/232* | (2006.01) | |
| *H04N 5/355* | (2011.01) | |

(52) U.S. Cl.
CPC .............. *H04N 5/243* (2013.01); *B60R 1/00* (2013.01); *B60R 1/002* (2013.01); *H04N 5/3572* (2013.01); *H04N 9/735* (2013.01); B60R 2300/303 (2013.01); H04N 5/23245 (2013.01); H04N 5/35554 (2013.01)

(58) Field of Classification Search
CPC ........... H04N 5/23245; H04N 5/35554; H04N 9/735; H04N 5/3572; H04N 5/243; B60R 1/002; B60R 2300/303; B60R 1/00

USPC ........................................................ 348/148
See application file for complete search history.

(56) References Cited

U.S. PATENT DOCUMENTS

| | | | | |
|---|---|---|---|---|
| 2004/0179113 | A1* | 9/2004 | Suzuki | H04N 9/735 348/223.1 |
| 2010/0231748 | A1* | 9/2010 | Takeda | G03B 5/00 348/229.1 |
| 2011/0249120 | A1* | 10/2011 | Bingle | B60R 11/04 348/148 |

FOREIGN PATENT DOCUMENTS

IE    WO 2011000392  A1 *  1/2011  ............... H04N 5/20

OTHER PUBLICATIONS

Okada. JP 2006-217418 Translation. Aug. 2006.*
Akyuz et al. "Noise reduction in high dynamic range imaging". J. Vis. Commun. Image R. 18 (2007), pp. 366-376.*

* cited by examiner

*Primary Examiner* — Zhihan Zhou
(74) *Attorney, Agent, or Firm* — Osha Liang LLP

(57) ABSTRACT

A method for operating a camera system of a motor vehicle, in which images of an environmental region of the motor vehicle are captured by means of an image sensor of the camera system via an optic device and an image correction function is activated by means of a control unit of the camera system, in which a light fall-off in a boundary region of the images caused by the optic device is compensated for, wherein a current brightness level of the environmental region is captured by means of the control unit and the activation and deactivation of the image correction function are effected depending on the current brightness level.

7 Claims, 2 Drawing Sheets

Figure 1:
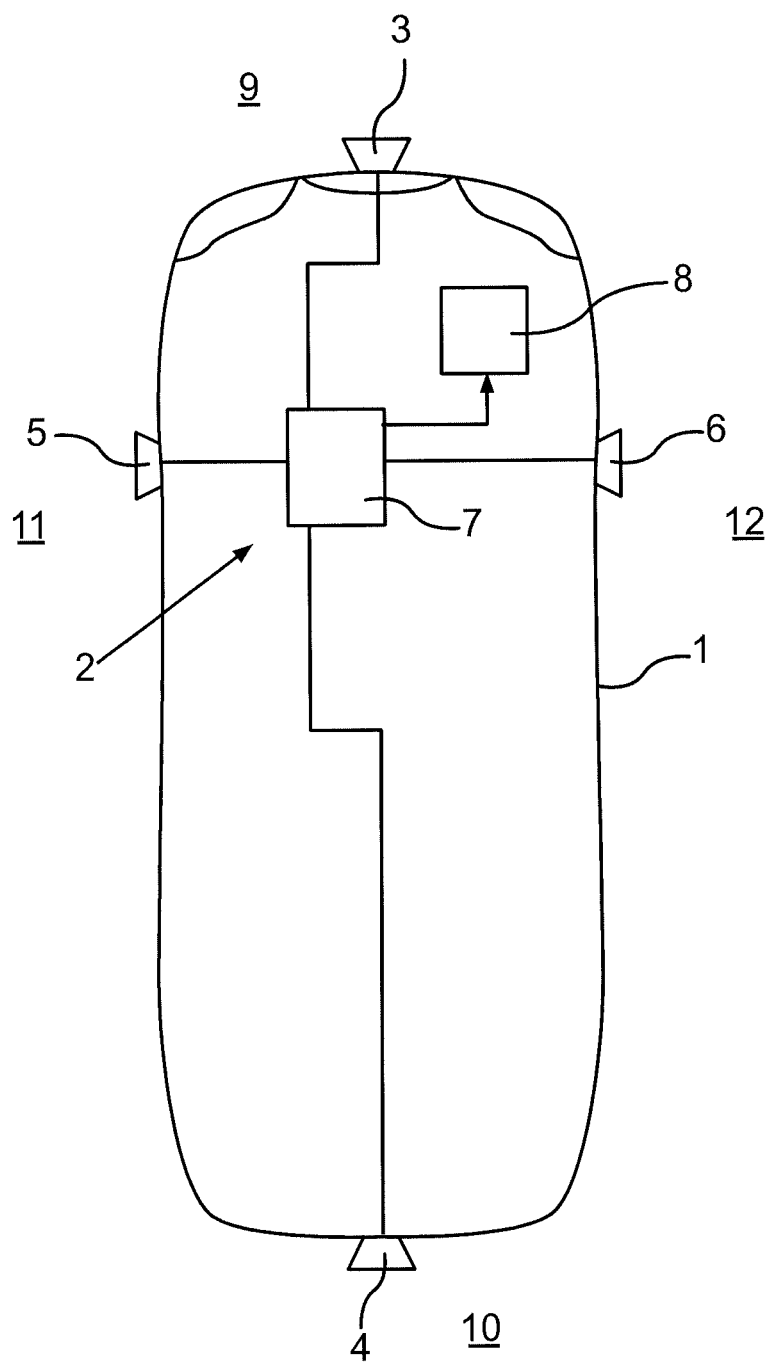

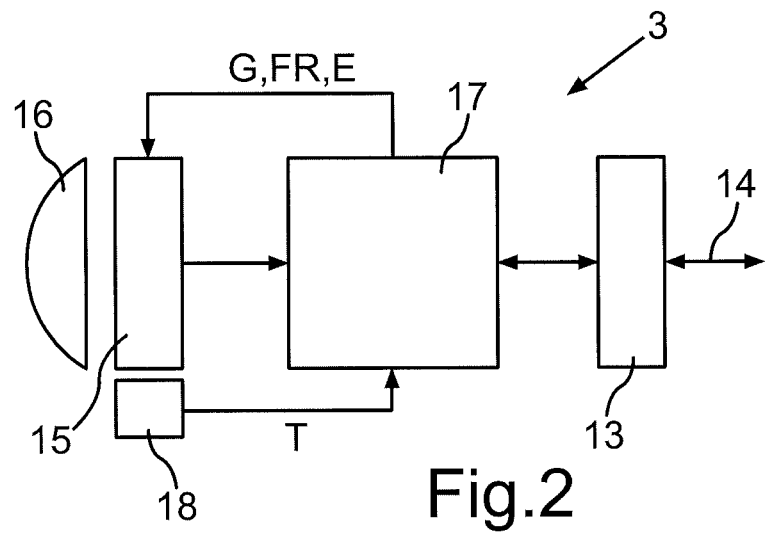
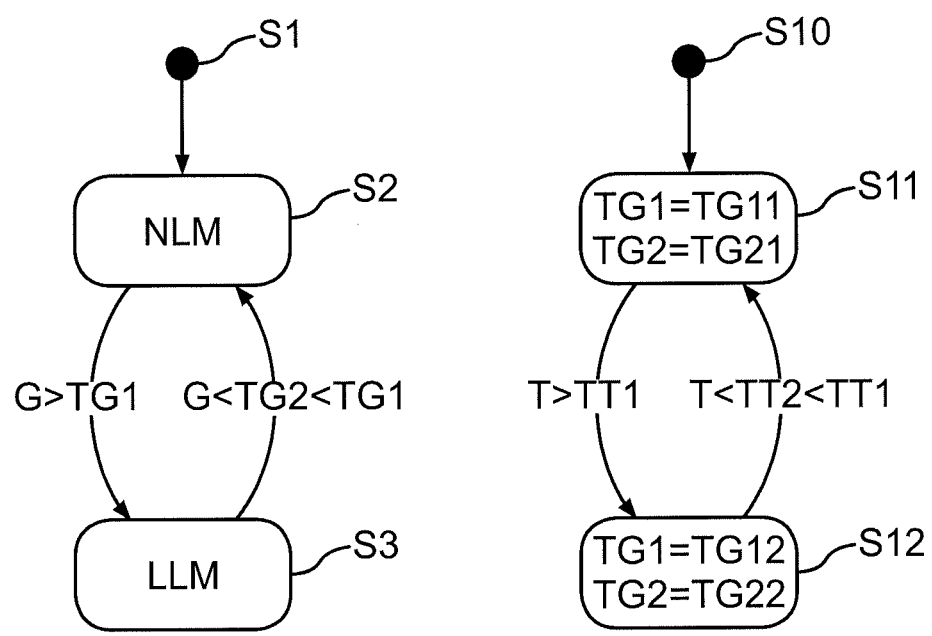
Fig.2
Fig.3
Fig.4

METHOD FOR ACTIVATING AND DEACTIVATING AN IMAGE CORRECTION FUNCTION, CAMERA SYSTEM AND MOTOR VEHICLE

The invention relates to a method for operating a camera system of a motor vehicle, wherein images of an environmental region of the motor vehicle are captured by means of an image sensor of the camera system via an optic device of the camera system, and wherein an image correction function is activated by means of a control unit of the camera system. With an activated image correction function, a light fall-off in a boundary region of the images caused by the optic device is compensated for. In addition, the invention relates to a camera system for performing such a method, as well as to a motor vehicle with a camera system.

Vehicle cameras are already prior art. It is already known to attach several cameras to a motor vehicle, which provide images of the environment around the motor vehicle. Each camera captures an environmental region of the motor vehicle, and the provided images can for example be presented on a display in the interior of the motor vehicle. In this context, for example a so-called "bird eye view" image can be generated based on the images of all of the cameras, which shows a plan view of the motor vehicle and the environment thereof from a bird's eye view.

In today's vehicle cameras, usually, an optic device—in particular a lens—is employed, which has a relatively wide opening angle. For example, here, so-called fish eye lenses are employed. Lenses are for example employed, which have an opening angle greater than 160°. The opening angle can even be 190°. However, such a wide-angle optic device has the side effect that the optic device has a lower transmission factor for light incident at a greater angle of incidence. This optical effect results in the fact that the pixels in the boundary region of the image are darker than in the center of the image. This effect is referred to as "boundary light fall-off" and resembles the so-called vignetting. The consequence is that the brightness of the pixels decreases towards the image boundary. In order to compensate for this light fall-off in the boundary region of the images, in the prior art, an image correction function is applied. This function is also referred to as a "lens correction" and provides that the darker pixels in the boundary region of the images are multiplied by a compensation factor such that overall a greater digital amplification for the dark pixels than for the pixels in the center of the image results.

In addition, it is prior art that a camera can be switched from a normal light mode to the so-called low light mode. In the low light mode, a greater gain factor with respect to the normal light mode is adjusted, with which the analog image signals of the image sensor are amplified. In the low light mode, the exposure time is additionally increased and the frame rate of the image sensor is reduced. Therein, an image repetition frequency is understood by the term "frame rate", with which frames are provided by means of the image sensor. Thus, the frame rate specifies the number of the provided images per time unit (per second). Therein, it is usual to adjust a frame rate of for example 30 images per second in the normal light mode and a frame rate of for example 15 images per second in the low light mode. This switching to the low light mode is usually effected depending on the brightness of the depicted scene. With a darker scene, the exposure time is increased, which in turn results in reduction of the frame rate.

It is an object of the invention to demonstrate a solution, how in a method of the initially mentioned kind, the quality of the images in the boundary region can be improved compared to the prior art.

According to the invention, this object is solved by a method, by a camera system as well as by a motor vehicle having the features according to the respective independent claims. Advantageous implementations of the invention are the subject matter of the dependent claims, of the description and of the figures.

In a method according to the invention for operating a camera system of a motor vehicle, images of an environmental region of the motor vehicle are captured by means of an image sensor of the camera system via an optic device. A control unit activates an image correction function, which compensates for a light fall-off in a boundary region of the images, which is caused by the optic device. According to the invention, it is provided that a current brightness level of the environmental region is captured by means of the control unit and the activation and deactivation of the image correction function is effected depending on the current brightness level.

By such an approach, the quality of the images in the boundary region can be improved compared to the prior art. Therein, the invention is based on the realization that the darker pixels, which are located in the boundary region of the images and are darker than other pixels due to the lower transmission factor of the optic device for greater angles of incidence, are considerably more susceptible to noise than the brighter pixels. If the analog image signals are amplified with a gain factor by means of an analog amplifier, which is typically performed within the camera, thus, a two-fold amplification overall results for the pixels in the boundary region, namely by the analog amplifier on the one hand and by the digital image correction function on the other hand, in which the pixels in the boundary region are multiplied by a compensation factor in the digital range. The gain factor of the analog amplifier in turn depends on the brightness level of the depicted environmental region (of the depicted scene). Therein, the relation applies that the darker the depicted scene, the greater the gain factor of the analog amplifier. In a darker environmental region, thus, the generation of the noise at the pixels in the boundary region is favored. In order to prevent this, according to the invention, the image correction function is activated and deactivated depending on the current brightness level of the scene.

The reduction of the noise in the boundary region of the images also has the advantage that the so-called "black level" of the pixels can be reduced. In addition, the automatic white balance of the camera can be improved in a dark scene—in particular in the low light mode. Namely, in a brighter scene, blue pixels can simpler become noisy than green or red pixels, because the blue pixels have a lower quantum efficiency.

The control unit can directly or indirectly capture the current brightness level of the environmental region. In an embodiment, it is provided that the brightness level is indirectly captured and the control unit captures an operating parameter of the image sensor, which is correlated with the brightness level of the environmental region. The activation and deactivation of the image correction function can then be effected depending on a current value of the operating parameter. Therein, for example a gain factor of the analog amplifier and/or an exposure time of the image sensor can be used as the operating parameter. This embodiment exploits the fact that the gain factor and/or the exposure time are usually automatically adjusted in a camera depending on the brightness of the scene and thus represent an exact measure of the brightness level. This operating parameter can thus be directly read out from the control unit and then characterizes the current brightness level of the environment. If a high gain factor and/or a high exposure time are adjusted, thus, the image correction function can be deactivated because a high gain factor and/or high exposure time indicate a dark scene.

Preferably, the camera system is switched from a normal light mode to a low light mode depending on the current brightness level—preferably depending on the mentioned operating parameter. In the low light mode, a higher gain factor of the analog amplifier and/or a higher exposure time of the image sensor and/or a reduced frame rate of the image sensor are adjusted with respect to the normal light mode. Therein, it has proven particularly advantageous if the image correction function is at the same time deactivated with switching to the low light mode and is again activated with switching again to the normal light mode. Namely, usually, it is the low light mode, in which an increased gain factor and a greater exposure time are adjusted and the pixels in the boundary region of the images can thus more likely become noisy. This embodiment ensures that the noise at the pixels in the boundary region can be reduced in the low light mode and thus overall an improved image structure is perceivable in the boundary region of the images and the image information is not lost.

The switching of the camera system between the normal light mode and the low light mode can also be performed considering the current value of the temperature of the image sensor. Namely, in the prior art, the following problem has turned out: With a dark scene, a relatively high gain factor of the image sensor is correspondingly set in order to extract the information present in the image even at dark pixels. With a higher gain factor, however, the so-called dark current of relatively high intensity arises in the image sensor. This dark current then changes the voltage quantity corresponding to the brightness of the pixels, which in turn results in automatic reduction of the gain factor and the exposure time. In other words, the camera believes that the imaged scene is brighter than in fact, although the increase of the brightness of the pixels is actually caused by the dark current. This false interpretation of the brightness of the imaged scene can result in the frame rate of the camera not being reduced at all.

For this reason, the switching of the camera system between the normal light mode and the low light mode can be performed considering the current temperature value of the image sensor. This is based on the realization that the switching between the different operating modes is not always reliably effected in the prior art. A further realization is in that the problems in the prior art are caused in that a higher gain factor of the image sensor is set with a darker scene, which in turn causes the dark current in the image sensor. The dark current then causes increase of the brightness of the pixels, which is erroneously interpreted as a change of the brightness of the imaged scene by the camera. Further, the invention is based on the realization that the dark current is proportional to the temperature of the image sensor and the disadvantages of the prior art can be avoided in that the current temperature of the image sensor is also taken into account in adjusting the frame rate of the camera. The switching between the operating modes can therefore be more reliably performed compared to the prior art.

The switching between the normal light mode and the low light mode is preferably effected depending on a comparison of the current value of an operating parameter, which is correlated with the brightness level of the scene, to at least one threshold, which is adjusted depending on the current temperature value of the image sensor. Here, the mentioned gain factor of the analog amplifier is preferably used as the operating parameter. Thus, the consideration of the temperature can be implemented without much effort upon switching between the two modes.

The switching from the normal light mode to the low light mode can be effected if the current value of the operating parameter (in particular of the gain factor) exceeds a first threshold, which is adjusted depending on the current temperature value of the image sensor. And vice versa, the camera system can be switched from the low light mode again to the normal light mode if the operating parameter falls below a second threshold, which is adjusted depending on the current temperature value. Therein, the second threshold can be a threshold different form the first threshold, in particular a smaller threshold, such that a hysteresis is provided, which provides for additional stability and robustness upon switching. Alternatively, identical thresholds can also be implemented such that both for exceeding and deceeding, a single threshold is provided, which is adjusted depending on the temperature of the image sensor.

Preferably, the relation applies that at a higher temperature of the image sensor, the at least one threshold is adjusted to a lower threshold value than at a lower temperature. This means that at a higher temperature, the switching from the normal light mode to the low light mode is effected earlier—i.e. at a lower value of the gain factor—than at a lower temperature. In this manner, the dark current is compensated for in the reduction of the frame rate.

Preferably, the at least one threshold for the operating parameter is set depending on a comparison of the current temperature value of the image sensor to at least one temperature threshold value. This embodiment too provides for reduced computational effort. Namely, the current temperature of the image sensor is compared to at least one temperature threshold value, and depending on the result of this comparison, the at least one threshold for the operating parameter is set.

In particular, this can be configured such that the at least one threshold for the operating parameter is reduced from a first threshold value to a lower second threshold value if the current temperature value exceeds a first temperature threshold value. The at least one threshold for the operating parameter can be again increased from the second threshold value to the first threshold value if the current value of the temperature deceeds a second temperature threshold value. Preferably, the first and the second temperature threshold value can be threshold values different from each other such that a hysteresis is implemented in setting the at least one threshold for the operating parameter, which provides for additional robustness and reliability in setting the threshold for the operating parameter.

In an embodiment, the image sensor can be an HDR image sensor, by means of which HDR images ("high dynamic range" or "high dynamic range imaging") of the environmental region are provided. For providing an HDR image, therein, at least two exposure time values of the HDR image sensor are adjusted. Then, the above mentioned image correction function can be applied exclusively to pixels, which have been generated with a higher one of the exposure time values. This embodiment reduces the noise of an HDR image because the image correction function is not applied to the pixels with the lower exposure time value, which can become noisy with higher probability. It can optionally also be provided that—at least in one operating mode of the image sensor—three exposure time values of the HDR image sensor are adjusted. These can include a short exposure time value, a long exposure time value and a very short exposure time value. Then, the above mentioned image correction function can be applied exclusively to pixels, which have been generated with the long exposure time value and/or the short exposure time value.

With an HDR image sensor, two images with different exposure time values are captured and processed to one HDR image. Alternatively, different exposure values can also be defined for different image regions of the same image. Preferably, the HDR image sensor is formed according to the so-called "split pixel technology", in which two images of the environmental region are captured at the same time with two different exposure time values, which reduces the HDR motion blur. Therein, the image correction function is applied to that partial image of the HDR image, which has been captured with the higher exposure time.

For example, the image sensor OV10630 or OV10635 of the company Omnivision can be employed.

However, alternatively, a non-HDR image sensor can also be used.

In addition, the invention relates to a camera system formed for performing a method according to the invention.

A motor vehicle according to the invention, in particular a passenger car, includes a camera system according to the invention.

The preferred embodiments presented with respect to the method according to the invention and the advantages thereof correspondingly apply to the camera system according to the invention as well as to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on a preferred embodiment as well as with reference to the attached drawings.

There show:

FIG. 1 in schematic illustration a motor vehicle with a camera system according to an embodiment of the invention;

FIG. 2 in schematic illustration a block diagram of an individual camera of the camera system; and FIGS. 3 and 4 flow diagrams for explaining a method according to an embodiment of the invention.

A motor vehicle 1 illustrated in FIG. 1 is for example a passenger car. The motor vehicle 1 includes a camera system 2, which has a plurality of cameras 3, 4, 5, 6 in the embodiment, which are disposed distributed on the motor vehicle 1. In the embodiment, four cameras 3, 4, 5, 6 are provided, wherein the invention is also not restricted to such a number and arrangement of the cameras 3, 4, 5, 6. Basically, any number of cameras can be used, which can be disposed at different locations of the motor vehicle 1. Alternatively to such a multi-camera system 2, a camera system 2 with a single camera can also be used.

A first camera 3 is for example disposed on the front bumper of the motor vehicle. A second camera 4 is for example disposed in the rear region, for instance on the rear bumper or on a tailgate. The two lateral cameras 5, 6 can for example be integrated in the respective exterior mirrors. The cameras 3, 4, 5, 6 are electrically coupled to a central computing device 7, which in turn is coupled to a display device 8. The display device 8 can be an LCD display.

The cameras 3, 4, 5, 6 are video cameras, which can each capture a sequence of images per time unit and communicate it to the computing device 7. The cameras 3, 4, 5, 6 each have a large opening angle, for instance in a range of values from 150° to 200°. They can also be so-called fish-eye cameras. Optionally, the cameras 3, 4, 5, 6 can also be HDR cameras.

The camera 3 captures an environmental region 9 in front of the motor vehicle 1. The camera 4 captures an environmental region 10 behind the motor vehicle 1. The camera 5 captures a lateral environmental region 11 to the left of the motor vehicle 1, while the camera 6 captures an environmental region 12 on the right side of the motor vehicle. The cameras 3, 4, 5, 6 provide images of the respective environmental regions 9, 10, 11, 12 and communicate these images to the computing device 7. As is apparent from FIG. 1, the imaged environmental regions 9, 10, 11, 12 mutually overlap in pairs. From the images of the cameras 3, 4, 5, 6, the computing device 7 generates an image presentation, which is then displayed on the display device 8. This image presentation can for example be a plan view presentation, which shows the motor vehicle 1 and its environment 9, 10, 11, 12 from a bird's eye view.

Therein, an exemplary construction of an individual camera 3 is shown in FIG. 2 in schematic and simplified manner. The camera 3 includes a communication interface 13, which is connected to a communication bus 14 of the motor vehicle 1. The camera 3 can communicate with the central computing device 7 via the communication bus 14.

The camera 3 is a video camera. It includes an image sensor 15, which is disposed behind an optic device 16, in particular a lens. The image sensor 15 can for example be a CCD sensor or a CMOS sensor. The image sensor 15 is coupled to a control unit 17, which receives the digital images of the image sensor 15.

The control unit 17 is also coupled to the interface 13, via which the control unit 17 communicates with the central computing device 7.

As already explained, the camera 3 is illustrated in FIG. 2 in simplified manner. Therein, the image sensor 15 can also have an analog amplifier, by means of which the analog images are amplified with a gain factor G, besides the actual image array, by means of which the analog images are generated. In addition, the image sensor 15 can also include an AD converter, by means of which the analog images are converted to digital images.

Various operating parameters of the image sensor 15 can be adjusted by means of the control unit 17. Among other things, the mentioned gain factor G, a frame rate FR as well as an exposure time E are adjusted by means of the control unit 17. Alternatively, these operating parameters G, FR, E can also be preset by the central computing device 7.

The camera 3 also includes a temperature sensor 18 capturing the current temperature T of the image sensor 15 and communicating it to the control unit 17. Alternatively, the temperature T can also be computationally determined based on the image data.

The camera 3 can be switched between a normal light mode NLM and a low light mode LLM. The switching of the camera 3 is now explained in more detail with reference to FIG. 3. The method starts in a step S1 and proceeds to a step S2, in which the normal light mode NLM is activated. Here, the frame rate FR is adjusted to a first value, for example 30 images per second. In this normal light mode, the gain factor G and the exposure time E are also lower than in the low light mode LLM.

The control unit 17 then continuously checks in real-time if the current gain factor G exceeds a first threshold TG1. If G is greater than TG1, the method proceeds to a step S3, in which the camera 3 is switched to the low light mode LLM. In this low light mode LLM, the frame rate FR is reduced to a second value, which may for example be 15 images per second. If the camera 3 is in the low light mode, thus, the control unit 17 checks if the gain factor G falls below a second threshold TG2. This second threshold TG2 is smaller than the first threshold TG1. Alternatively, a same threshold can also be used. By providing two different thresholds TG1 and TG2, a hysteresis is implemented such that the switching is overall effected more robustly. Thus, frequent switching operations are prevented.

The two thresholds TG1 and TG2 can also be adjusted depending on the current temperature T. A method for adjusting the thresholds TG1 and TG2 is explained in more detail with reference to FIG. 4:

This method starts in a step S10 and proceeds to a step S11, in which the first threshold TG1 is set to a first threshold value TG11. At the same time, the second threshold TG2 is set to a second value TG21, wherein TG21<TG11.

If the temperature T now exceeds a first temperature threshold value TT1, thus, the method proceeds to a further step S12, in which the two thresholds TG1 and TG2 are reduced and herein are set to a third value TG12 and a fourth value TG22, respectively, wherein TG12<TG11 and TG22<TG21. Preferably, the following relation can also apply: (TG12−TG22)=(TG11−TG21). In other words, the difference between the first threshold TG1 and the second threshold TG2 can remain constant.

If the temperature T now deceeds again a second temperature threshold value TT2, thus, the method again returns to the step S11 such that the thresholds TG1 and TG2 are again increased. Therein, the second temperature threshold value TT2 is smaller than the first temperature threshold value TT1. Thereby too, a hysteresis is provided such that frequent switching between the thresholds is prevented. However, alternatively, a single temperature threshold value can also be used. Then, it applies: TT1=TT2.

In the embodiment, the following values can be used: TT1=70° C. and TT2=65° C. Generally, a difference between the temperature threshold values TT1 and TT2 can be in a range of values from 0 to 10° C.

In the control unit 17 (or alternatively in the computing device 7), an image correction function is also implemented, which serves for compensation for a light fall-off in the boundary region of the images, which is caused by the optic device 16 and more precisely by the wide opening angle larger than 160°. This image correction function provides that the brightness values—namely the Y values—of the pixels in the boundary region of the images are multiplied by a compensation factor and thus amplified. This compensation factor can also be different for different pixels, namely depending on the distance to the boundary of the image. The compensation factor can in particular be greater towards the image boundary.

This image correction function is now activated exclusively in the normal light mode NLM and deactivated upon switching to the low light mode LLM. If the camera 3 is again switched to the normal light mode NLM, thus, the image correction function is again activated. The activation and deactivation of the image correction function are therefore depending on the current brightness of the environment 9, 10, 11, 12 of the motor vehicle 1.

Alternatively to a non-HDR image sensor 15, an HDR image sensor 15 can also be employed, by means of which HDR images of the environment 9, 10, 11, 12 are provided. For providing an HDR image, therein, two conventional images are captured with different exposure times E and processed together to an HDR image. Here, the image correction function can be applied exclusively to that image or those pixels, which have been generated with the higher exposure time.

The invention claimed is:

1. A method for operating a camera system of a motor vehicle, comprising:
    capturing images of an environmental region of the motor vehicle by means of an image sensor of the camera system via an optic device and an image correction function is activated by means of a control unit of the camera system, in which a light fall-off in a boundary region of the images caused by the optic device with a wide opening angle is compensated for, wherein
    a current brightness level of the environmental region is captured by means of the control unit and the activation and deactivation of the image correction function are effected depending on the current brightness level and depending on the current brightness level the camera system is switched from a normal light mode (NLM) to a low light mode (LLM), in which a gain factor and/or an exposure time are increased with respect to the normal light mode (NLM) and/or a frame rate (FR) of the image sensor is reduced, wherein the image correction function is deactivated upon switching to the low light mode (LLM) and is again activated upon switching again to the normal light mode (NLM);
    detecting a temperature of the image sensor; and
    effecting the switching based on a current value of the temperature by comparing a current value of an operating parameter of the image sensor, which is correlated with the brightness level and a gain factor, to at least one threshold, which is adjusted depending on the current value of the temperature.

2. The method according to claim 1, wherein an operating parameter of the image sensor is captured by means of the control unit, which is correlated with the brightness level of the environmental region, and the activation and deactivation of the image correction function are effected depending on a current value of the operating parameter.

3. The method according to claim 2, wherein a gain factor and/or an exposure time are used as operating parameter.

4. The method according to claim 1, wherein at a higher temperature, the at least one threshold is adjusted to a lower threshold value than at a lower temperature.

5. The method according to claim 1, wherein the image sensor is an HDR image sensor, by means of which HDR images of the environmental region are provided, wherein for providing an HDR image, at least two exposure time values of the HDR image sensor are adjusted, and wherein the image correction function is applied exclusively to pixels, which have been generated with a higher one of the exposure time values.

6. A camera system for a motor vehicle comprising:
    an optic device having a wide opening angle with an image sensor for providing images of an environmental region of the motor vehicle via the optic device; and a control unit for activating and deactivating an image correction function, in which a light fall-off in a boundary region of the images caused by the optic device is compensated for, wherein the control unit is adapted to capture a current brightness level of the environmental region and to activate and deactivate the image correction function depending on the current brightness level and depending on the current brightness level the camera system is switched from a normal light mode (NLM) to a low light mode (LLM), in which a gain factor and/or an exposure time are increased with respect to the normal light mode (NLM) and/or a frame rate (FR) of the image sensor is reduced, wherein the image correction function is deactivated upon switching to the low light mode (LLM) and is again activated upon switching again to the normal light mode (NLM), wherein a temperature of the image sensor is detected and the switching is effected based on a current value of the temperature, dependent on a comparison of the current value of an operating parameter of the image sensor, which is correlated with the brightness level and a gain factor, to at least one threshold, which is adjusted depending on the current value of the temperature.

7. A motor vehicle with a camera system according to claim 6.

* * * * *